(12) United States Patent
Kasichainula

(10) Patent No.: US 10,122,484 B1
(45) Date of Patent: Nov. 6, 2018

(54) TECHNOLOGIES FOR INTERNAL TIME SYNCRHONIZATION

(71) Applicant: Intel Corporation, Santa Clara, CA (US)

(72) Inventor: Kishore Kasichainula, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/639,193

(22) Filed: Jun. 30, 2017

(51) Int. Cl.
*H04L 7/02* (2006.01)
*H04J 3/06* (2006.01)
*G06F 1/12* (2006.01)
*G06F 1/10* (2006.01)

(52) U.S. Cl.
CPC ............ *H04J 3/0644* (2013.01); *G06F 1/10* (2013.01); *G06F 1/12* (2013.01); *G06F 2201/84* (2013.01)

(58) Field of Classification Search
CPC ..... H04L 7/003; H04L 7/027; H04L 12/2801; H04L 43/0682; H04L 67/1095; H04N 21/242; H04N 7/17309
USPC .......................... 375/359, 222; 713/216, 300
See application file for complete search history.

(56) References Cited

U.S. PATENT DOCUMENTS

| | | | |
|---|---|---|---|
| 8,700,943 B2* | 4/2014 | Dixon ................. | G06F 11/1658 713/300 |
| 2004/0190544 A1* | 9/2004 | Azenko .............. | H04L 12/2801 370/442 |
| 2016/0072883 A1* | 3/2016 | Long ................... | H04L 67/1095 709/219 |

* cited by examiner

*Primary Examiner* — Khai Tran
(74) *Attorney, Agent, or Firm* — Barnes & Thornburg LLP

(57) ABSTRACT

Technologies for internal time synchronization in a compute device are disclosed. A timestamp value from an always running timer in the compute device may be broadcast using a serial broadcast wire to other components of the compute device, such as a network interface card. The network interface card may keep a local always running timer that mirrors the always running timer and synchronized to the always running timer by monitoring the serial broadcast wire. The network interface card may take a snapshot of both a system timer on the network interface card and the local always running timer. The network interface card may oversample the local always running timer in order to capture a more precise snapshot of the local always running timer.

25 Claims, 5 Drawing Sheets

TECHNOLOGIES FOR INTERNAL TIME SYNCRHONIZATION

BACKGROUND

Time synchronization between components of a compute device is important for several applications. For example, it may be important to accurately determine the timing of sending or receiving packets that are sent or received over a network, such as in time sensitive network applications. However, the timing of the circuit that sends and receives network packets may not be directly synchronized with other components of the compute device.

The components of a compute device may be synchronized by sending messages between the various components. However, the messages may have an unknown amount of latency associated with them, leading to a relatively large uncertainty in the true timing associated with a particular message.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
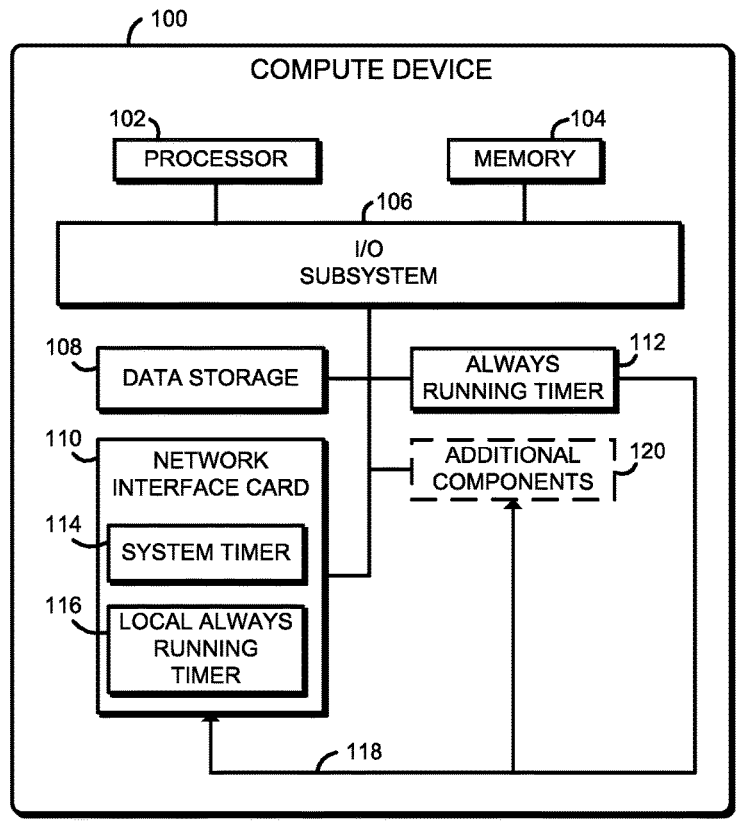
FIG. 1 is a simplified block diagram of at least one embodiment of a compute device for internal time synchronization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to perform internal time synchronization. In use, an always running timer 112 of the compute device 100 is configured to maintain a counter indicative of a time. The always running timer 112 is connected to a serial broadcast wire 118, which may be connected to one or more additional components of the compute device 100 such as a network interface card 110. The illustrative always running timer 112 periodically samples the value of the counter and broadcasts a timestamp value based on the sampled value of the counter. Signals sent on the serial broadcast wire 118 may be sent using a clock that may be a relatively low frequency, such as 19.2 megahertz (MHz). The components which receive the broadcasted timestamp value, such as the network interface card 110, may monitor the signal from the single-wire interface and maintain a local always running timer 116 that mirrors the always running timer used the sampled signal. The network interface card 110 may then capture a snapshot of both a system timer 114 on the network interface card 110 and the local always running timer 116. The network interface card 110 may oversample the local always running timer 116 at a relatively high frequency clock rate, such as 200 MHz. Oversampling the local always running timer 116 will allow the network interface card 110 to determine the phase of the local always running timer 116 relative to the system timer 114, and therefore capture a more precise snapshot of the local always running timer 116.

The compute device 100 may be embodied as any type of compute device capable of managing data packets and performing the functions described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the compute device 100 may be embodied as an Internet-of-Things device and form, potentially with other devices, a mesh network, which may operate at the edge of a cloud network, as described below in more detail in regard to FIG. 5. The illustrative compute device 100 includes a processor 102, a memory 104, an input/output (I/O) subsystem 106, data storage 108, the network interface card 110, the always running timer 112, and the serial broadcast wire 118. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip or a single multi-chip package.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The network interface card 110 may be embodied as any type of interface capable of interfacing the compute device 100 with other compute devices, such as over a network. In some embodiments, the network interface card 110 may be referred to as a host fabric interface (HFI). The network interface card 110 may be configured to use any one or more communication technology and associated protocols (e.g., Ethernet, Bluetooth®, Wi-Fi®, WiMAX, near field communication (NFC), etc.). The network interface card 110 may be capable of interfacing with any appropriate cable type, such as an electrical cable or an optical cable, and/or may be capable of interfacing with a wireless signal, such as through one or more antennae. The network interface card 110 may be located on silicon separate from the processor 102, or the network interface card 110 may be included in a multi-chip package with the processor 102, or even on the same die as the processor 102. The network interface card 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 100 to connect with another compute device. In some embodiments, network interface card 110 may be embodied as part of a system-on-a-chip (SoC) that includes one or more processors, or included on a multichip package that also contains one or more processors. In some embodiments, the network interface card 110 may include a local processor (not shown) and/or a local memory (not shown) that are both local to the network interface card 110. In such embodiments, the local processor of the network interface card 110 may be capable of performing one or more of the functions of the processor 102 described herein. Additionally or alternatively, in such embodiments, the local memory of the network interface card 110 may be integrated into one or more components of the compute device 100 at the board level, socket level, chip level, and/or other levels.

The network interface card 110 includes the system timer 114 and the local always running timer 116. The system timer 114 may run at a relatively high frequency, such as 200 MHz, and the local always running timer 116 may run at a relatively low frequency, such as 19.2 MHz. It should be appreciated that the system time 114 and the local always running timer 116 are free-running and not locked to one another. The system timer 114 may be used as a timer in certain networking operations, such as sending and receiving data packets. Each of the system timer 114 and the local always running timer 114 has an associated timing value, which increases by one for every period of a clock cycle of the corresponding clock. The timing value of the local always running timer 114 may be reset to a particular value, such as when a new timestamp value of the always running timer 112 has been received by the network interface card 110. It should be appreciated that the local always running timer 116 may operate based on the same clock as the always running timer 112. The local always running timer 116 may be powered down in certain instances, such as when the network interface card 110 is powered down.

The always running timer 112 may be embodied as any type of clock to produce timing values indicative of passage of time, such as a crystal oscillator or a ceramic oscillator, an inductor-capacitor (LC) clock, a resistor-capacitor (RC) clock, etc. The always running timer 112 may oscillate at any frequency, such as above or below 1, 2, 5, 10, 15, 20, 30, 35, 50, 100, or 250 megahertz (MHz) or between any of those values. In the illustrative embodiment, the always running timer 112 oscillates at approximately 19.2 MHz. The always running timer 112 has an associated timing value, which increases by one for every period of the always running timer 112. The timing value of the always running timer 112 may be stored in any manner, such as in a 64-bit register, a 32-bit register, a 16-bit register, a 10-bit register, an 8-bit register etc. The timing value of the always running timer 112 may always increase, or may be able to be reset to zero (or set to a specific value) by an instruction of the compute device 100. In some embodiments, the clock signal used to drive the always running timer 112 may be provided to other components of the compute device 100, such as the components to which the always running timer 112 broadcasts a signal through the serial broadcast wire 118. In the illustrative embodiment, the always running timer 112 is continues to run as long as power to the compute device 100 is available, and the always running timer 112 may have a battery used exclusively for the always running timer 112. In some embodiments, the always running timer 112 may be powered down in certain circumstances, such as when the compute device 100 is in a low power state such as a sleep or hibernation state or is completely turned off.

The serial broadcast wire 118 is configured to carry a broadcasted signal from the always running timer 112 to other components of the compute device 100, such as the network interface card 110 or additional components 120. In the illustrative embodiment, the serial broadcast wire 118 may be embodied as a single wire, including branches to each of the components to which the signal is being broadcast. The serial broadcast wire 118 may provide a single-ended signal relative to a ground signal, such as a ground plane or ground wire of the compute device 100. Additionally or alternatively, the serial broadcast wire 118 may be embodied as two or more wires which may carry a differential signal. In some embodiments, the serial broadcast wire 118 may not even be a wire, but may be an optical fiber or other medium to carry an optical or wireless signal. Signals sent on the serial broadcast wire 118 may operate at a clock frequency established by the always running timer 112, such as the same clock frequency which is used to drive the always running timer 112.

In some embodiments, the compute device 100 may include other or additional components, such as those commonly found in a compute device. For example, the compute device 100 may also have additional components 120, such as a field programmable gate array (FPGA), an application specific integrated circuit (ASIC), various input/output devices, etc. It should be appreciated that some or all of the additional components 120 may be connected to the serial broadcast wire 118.

Figure 2:
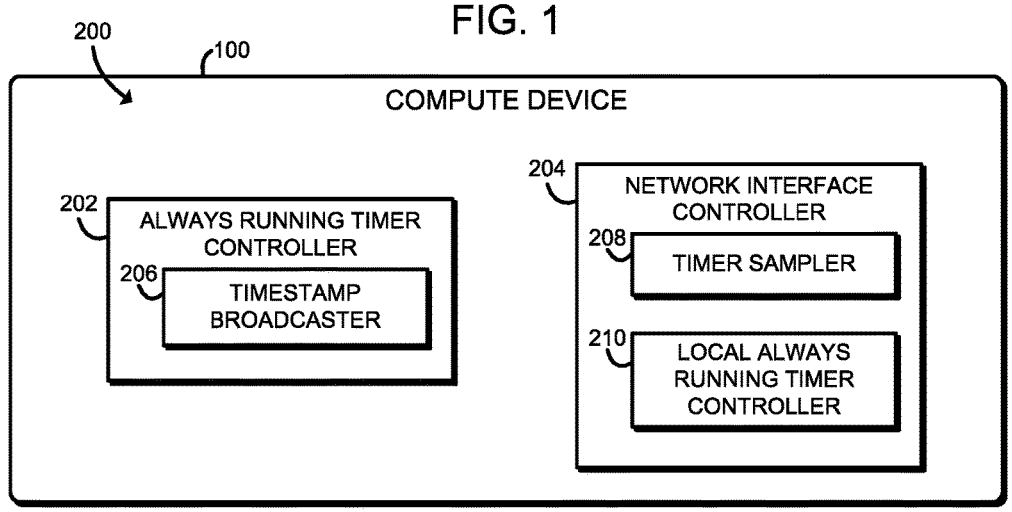
FIG. 2 is a block diagram of at least one embodiment of an environment that may be established by the compute device of FIG. 1.

Referring now to FIG. 2, in an illustrative embodiment, the compute device 100 establishes an environment 200 during operation. The illustrative environment 200 includes an always running timer controller 202 and a network interface controller 204. The various components of the environment 200 may be embodied as hardware, firmware, software, or a combination thereof. For example, the various modules, logic, and other components of the environment 200 may form a portion of, or otherwise be established by, the processor 102 or other hardware components of the compute device 102 such as the memory 104. As such, in some embodiments, one or more of the components of the environment 200 may be embodied as circuitry or collection of electrical devices (e.g., an always running timer controller circuit 202, a network interface controller circuit 204, etc.). It should be appreciated that, in such embodiments, one or more of the circuit (e.g., the always running timer controller circuit 202, the network interface controller circuit 204, etc.) may form a portion of the processor 102, the memory 104, the I/O subsystem 106, and/or other components of the compute device 100. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the processor 102 or other components of the compute device 100.

The always running timer controller 202 is configured to sample values of the always running timer 112, generate timestamp values based on the values of the always running timer 112, and broadcast the timestamp values over the serial broadcast wire 118. The always running timer controller 202 may add additional fields to the signal to be broadcast, such as a synchronization field and type field. The synchronization field may be one or more bits indicating a pattern that can be used to synchronize to the signal being broadcast. The pattern used for the synchronization field may be any suitable pattern, such as alternating ones and zeros. The type field may be one or more bits indicating various metadata relating to the timestamp value, such as whether the broadcasting is continuous or periodic, whether an offset value should be added to the timestamp value, and/or the like. In the illustrative embodiment, the synchronization field is 68 bits, the type field in 4 bits, and the field for the timestamp value is 64 bits. In some embodiments, the always running timer controller 202 may determine an offset value that is added to the timestamp value before broadcasting the timestamp value. The offset value may correspond to the time it takes for the signal of the serial broadcast wire 118 to reach other components of the compute device 100, so that the timestamp value that is broadcast would indicate the value of the always running timer 112 at the time the timestamp value is received. The offset value may be determined during design of the compute device 100 or components of the compute device 100 and stored in the compute device 100 for use by the always running timer controller 202.

The always running timer controller 202 includes a timestamp broadcaster 206. The timestamp broadcaster 206 is configured to broadcast the timestamp values generated by the always running timer controller 202 to other components of the compute device 100 over the serial broadcast wire 118. The timestamp broadcaster 206 may send timestamp values periodically, continuously, or continually. When broadcasting periodically, the timestamp broadcaster 206 may broadcast at any suitable interval, such as 10 microseconds, 20 microseconds, 50 microseconds, 100 microseconds, 200 microseconds, 500 microseconds, 1 millisecond, 2 milliseconds, 5 milliseconds, 10 milliseconds, etc. The timestamp broadcaster 206 may include a parallel to serial converter to convert a parallel bus signal (such as a 64-bit bus signal) to a serial signal for broadcasting on the serial serial-wire interface 118. It should be appreciated that, in the illustrative embodiment, the timestamp broadcaster 206 does not need a request for a timestamp before a timestamp is broadcast, but rather the timestamp broadcaster 206 will continue to broadcast timestamps even without any requests. In fact, in the illustrative embodiment, the serial broadcast wire 118 is configured to only provide one-way transmission of information from the always running timer 112 to other components of the compute device 100.

The network interface controller 204, which may be embodied as hardware, firmware, software, virtualized hardware, emulated architecture, and/or a combination thereof as discussed above, is configured to control the network interface card 110, including the interaction of the network interface card 110 with the physical medium to which it is attached and the processing of incoming and outgoing signals which the network interface card 110 receives and sends. The network interface controller 204 may be configured to use any one or more communication technology and associated protocols (e.g., Ethernet, Bluetooth®, Wi-Fi®, WiMAX, near field communication (NFC), etc.). The network interface controller 204 may be capable of interfacing with any appropriate cable type, such as an electrical cable or an optical cable, and/or may be capable of interfacing with a wireless signal, such as through one or more antennae. The network interface controller 204 includes a timer sampler 208 and a local always running timer controller 210. It should be appreciated that the network interface controller 204 may use the system timer 114 as a clock for sending and/or receiving data using the network interface card 110, while other components of the compute device 100 such as the processor 102 that are locked to the always running timer 112 may process packets or data that is sent and/or received on the network interface card 110. The synchronization between the system timer 114, the local always running timer 116, and the always running timer 112 may allow for networking tasks to be scheduled and/or timestamped more precisely.

The timer sampler 208 is configured to capture a snapshot of both the system timer 114 and the local always running timer 116. In the illustrative embodiment, the timer sampler 208 may capture a snapshot of both timers 114 and 116 simultaneously. Additionally or alternatively, the timer sampler 208 may capture a snapshot of the two timers 114 and 116 with a fixed delay that can be compensated for, such as one clock cycle. The timer sampler 208 may run based on a clock signal of the network interface card 110, such as the same clock signal that the system timer 114 runs on, which may be, e.g., a 200 MHz clock. As such, the timer sampler 208 may simply copy the value of the system timer 114 to capture a precise snapshot of the system timer 114. However, the local always running timer 116 may run based on a clock signal at a different frequency, such as 19.2 MHz. If not compensated for, merely capturing a snapshot of the value of the local always running timer 116 may lead to a relatively large uncertainty because of the unknown phase between the system timer 114 and the local always running timer 116. However, by oversampling the local always running timer 116, such as at a rate at least twice the frequency of the local always running timer 116, the timer sampler 208 can precisely determine the phase of the local always running timer 116 and the system 114. The timer sampler 208 saves the captured value of the system timer 114 and the local always running timer 116, including an adjustment to the value of the local always running timer 116 to compensate for the phase difference. It should be appreciated that the network interface controller 204 may access the captured values of the local always running timer 116 and the system timer 114 at some later time and determine, based on the captured values, the current value of the local always running timer 116 and/or the system timer 114. Since the local always running timer 116 and the system timer 114 operate a different frequencies, determining the value of each of them at some later time may require interpolation.

The local always running timer controller 210 is configured to control the local always running timer 114. The local always running timer controller 210 may monitor the signal of the single-wire interface 118. In the illustrative embodiment, the local always running timer controller 210 converts the serial signal of the serial broadcast wire 118 to a parallel signal before sampling the signal. Additionally or alternatively, the local always running timer controller 210 may sample the serial broadcast wire 118 directly without converting it to a parallel interface. The local always running timer controller 210 may read the timestamp value sent on the serial broadcast wire 118 and then the local always running timer controller 210 may update the value of the local always running timer 114 based on the timestamp value. In some embodiments, the local always running timer controller 210 may determine an offset value that is added to the timestamp value before updating the local always running timer 114. The offset value may correspond to the time it takes for the signal of the serial broadcast wire 118 to reach the network interface controller 204. The offset value may be determined during design of the compute device 100 or components of the compute device 100 and stored in the compute device 100 for use by the local always running timer controller 210. In the illustrative embodiment, the local always running timer controller 210 updates the local always running timer 116 to have the same value as the always running timer 112.

Figure 3:
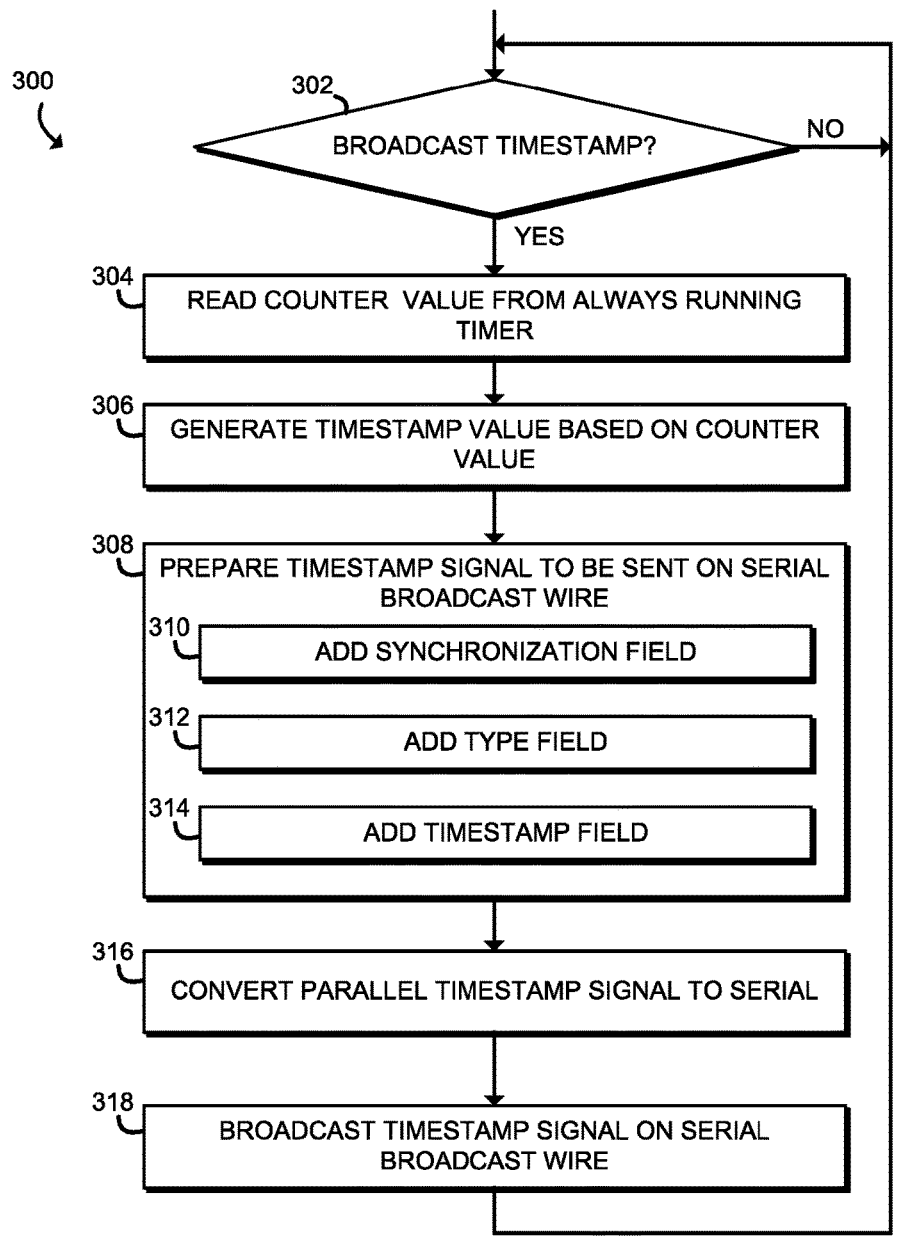
FIG. 3 is a simplified flow diagram of at least one embodiment of a method for broadcasting timestamp values that may be executed by the compute device of FIG. 1.

Referring now to FIG. 3, in use, the compute device 100 may execute a method 300 for broadcasting a timestamp. It should be appreciated that, in some embodiments, the operations of the method 300 may be performed by one or more components of the environment 200 of the compute device 100 as shown in FIG. 2. The method 300 begins in block 302, in which, if the compute device 100 is to broadcast a timestamp, the method 300 proceeds to block 304 to read a timestamp value from the always running timer 112. If the compute device 100 is not to broadcast a timestamp, the compute device 100 loops back to block 302 to continue checking if a timestamp should be broadcast. As discussed above, the compute device 100 may broadcast a timestamp periodically, continuously, or continually.

In block 304, the compute device 100 reads a counter value from the always running timer 112. In block 306, the compute device 100 generates a timestamp value based on the counter value of the always running timer 112. In some embodiments, the compute device 100 may determine an offset value that is added to the counter value to generate the timestamp value. The offset value may correspond to the time it takes for the signal of the serial broadcast wire 118 to reach other components of the compute device 100, so that the timestamp value that is broadcast would indicate the value of the always running timer 112 at the time the timestamp value is received. The offset value may be determined during design of the compute device 100 or components of the compute device 100 and stored in the compute device 100, so the compute device 100 may access the offset value in block 306. In some embodiments, the timestamp value may simply be equal to the counter value of the always running timer.

In block 308, the compute device 100 prepares a timestamp signal to be sent on the serial broadcast wire 118. In the illustrative embodiment, the compute device 100 adds a synchronization field, a type field, and a timestamp field to the timestamp signal. The compute device 100 adds the synchronization field in block 310. The synchronization field may be one or more bits indicating a pattern that can be used to synchronize to the timestamp signal being broadcast. The pattern used for the synchronization field may be any suitable pattern, such as alternating ones and zeros. The compute device 100 adds the type field to the timestamp signal in block 312. The type field may be one or more bits indicating various metadata relating to the timestamp value, such as whether the broadcasting is continuous or periodic, whether an offset value should be added to the timestamp value, and/or the like. The compute device 100 adds the timestamp field in block 314, which consists of the timestamp value generated in block 306. In the illustrative embodiment, the synchronization field is 68 bits, the type field in 4 bits, and the field for the timestamp value is 64 bits. In some embodiments, the synchronization field and/or the type field may be omitted.

In block 316, the compute device 100 converts the parallel timestamp signal prepared in block 308 to a serial timestamp signal. In block 318, the compute device 100 broadcasts the serial timestamp signal on the serial broadcast wire 118.

Figure 4:
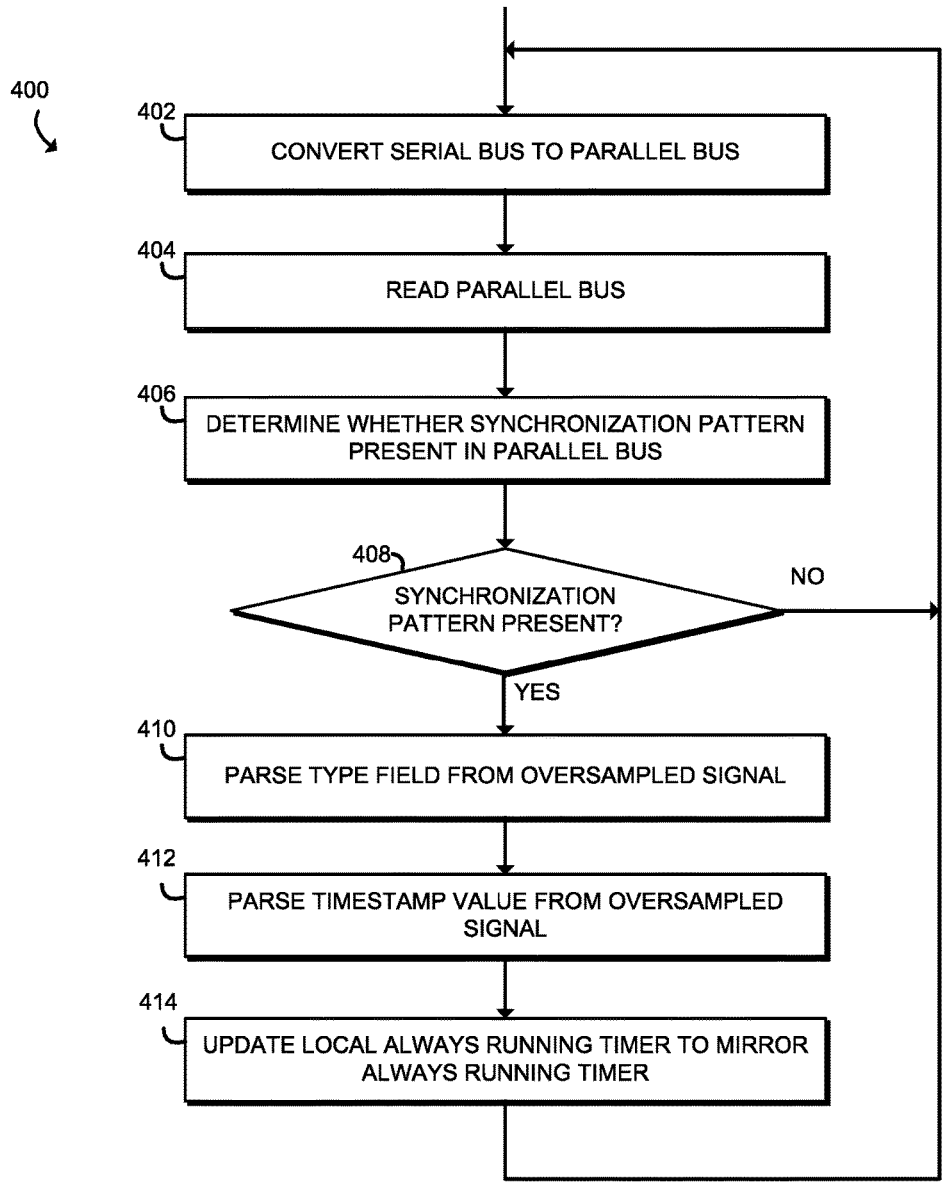
FIG. 4 is a simplified flow diagram of at least one embodiment of a method for receiving broadcasted timestamp values that may be executed by the compute device of FIG. 1.

Referring now to FIG. 4, in use, the compute device 100 may execute a method 400 for receiving broadcast timestamps. It should be appreciated that, in some embodiments, the operations of the method 400 may be performed by one or more components of the environment 200 of the compute device 100 as shown in FIG. 2. The method 400 begins in block 402, in which the compute device 100 converts the serial signal of the serial broadcast wire at the network interface card 110 to a parallel signal. In some embodiments, the compute device 100 may not convert the serial broadcast wire to a parallel signal and may sample the serial broadcast wire directly. It should be appreciated that, in the illustrative embodiment, the serial-to-parallel converter operates on the same clock frequency as the serial broadcast wire 118, which may, as discussed above, be provided to various components of the compute device 100 including the network interface card 110. In block 404, the compute device 100 reads the parallel bus. In block 406, the compute device 100 determines whether the synchronization pattern is present in the signal read from the parallel bus. The synchronization pattern may be any pattern composed of a series of one or more bits. In the illustrative embodiment, the synchronization pattern is 68 bits long, and may be, e.g., alternating ones and zeros.

In block 408, if the synchronization pattern in not found, the method 400 loops back to block 402 to continue converting the serial signal of the serial broadcast wire 118 to a parallel signal. If the synchronization pattern is found, the method 400 proceeds to block 410.

In block 410, the compute device 100 parses the type field from the oversampled signal. The type field may be one or more bits indicating various metadata relating to the timestamp value, such as whether the broadcasting is continuous or periodic, whether an offset value should be added to the timestamp value, the amount of the offset value, and/or the like. In block 412, the compute device 100 parses the timestamp value from the oversampled signal. The timestamp value may be any series of bits indicating a timing value, such as 64 bits in the illustrative embodiment.

In block 414, the compute device 100 updates a local always running timer 116 based on the received timestamp value to mirror the value of the always running timer 112. In some embodiments, the compute device 100 may determine an offset value that is added to the timestamp value before updating the local always running timer 116. The offset value may correspond to the time it takes for the signal of the serial broadcast wire 118 to reach the network interface card 110. The offset value may be determined during design of the compute device 100 or components of the compute device 100 and stored in the compute device 100 for use by the local always running timer card 110. The method 400 may then loop back to block 402 to continue monitoring the serial broadcast wire 118.

Figure 5:
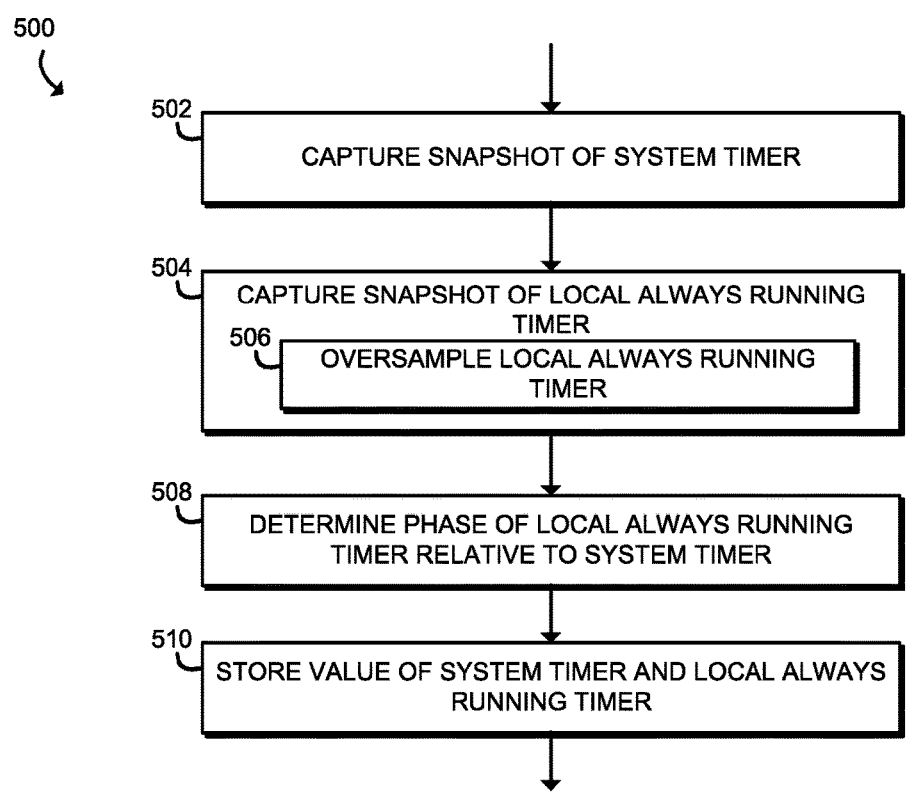
FIG. 5 is a simplified flow diagram of at least one embodiment of a method for capturing snapshots of a system timer and a local always running timer.

Referring now to FIG. 5, in use, the compute device 100 may execute a method 500 for capturing snapshots of the system timer 114 and the local always running timer 116. The method 500 begins in block 502, the compute device 100 captures a snapshot of the system timer 114. In the illustrative embodiment, the compute device 100 simply copies a counter value of the system timer, as the component capturing the snapshot of the system timer 114 may operate using the same clock as the system timer 114.

In block 504, the compute device 100 captures a snapshot of the local always running timer 116. To do so, the compute device 100 may oversample the local always running timer 116 in block 506, such as by sampling the local always running timer 116 at at least twice the frequency of the local always running timer 116. In the illustrative embodiment, the local always running timer 116 may operate at 19.2 MHz and the clock used to sample the local always running timer 116 may be 200 MHz.

In block 508, the compute device 100 determines the phase of the signal of the local always running timer 116 based on the oversampled data. Since the compute device 100 oversamples the signal of the local always running timer 116, the compute device 100 may determine a phase of the clock associated with the local always running timer 116 relative to a phase of the clock associated with the sampling of the local always running timer 116. Determining the phase of the clock allows for precise recovery of the time of the local always running timer 116 and, therefore, of the time of the always running timer 112.

In block 510, the compute device 100 stores the value of the system timer 114 and the value of the local always running timer 116, such as in a register of the network interface card 110 or the data storage 108. It should be appreciated that the compute device 100 may adjust the value of the local always running timer 116 based on the determined phase of the local always running timer 116 relative to the system timer 114 before storing the value of the local always running timer 116. Additionally or alternatively, the compute device 100 may store the value of the local always running timer 116 as captured from the local always running timer 116 along with the determined phase of the local always running timer 116 relative to the system timer 114.

It should be appreciated that, although the methods 400 and 500 were described as being performed at the network interface card 110, the methods 400 and 500 may also be performed at other components of the compute device 100, such as one or more of the additional components 120.

Figure 6:
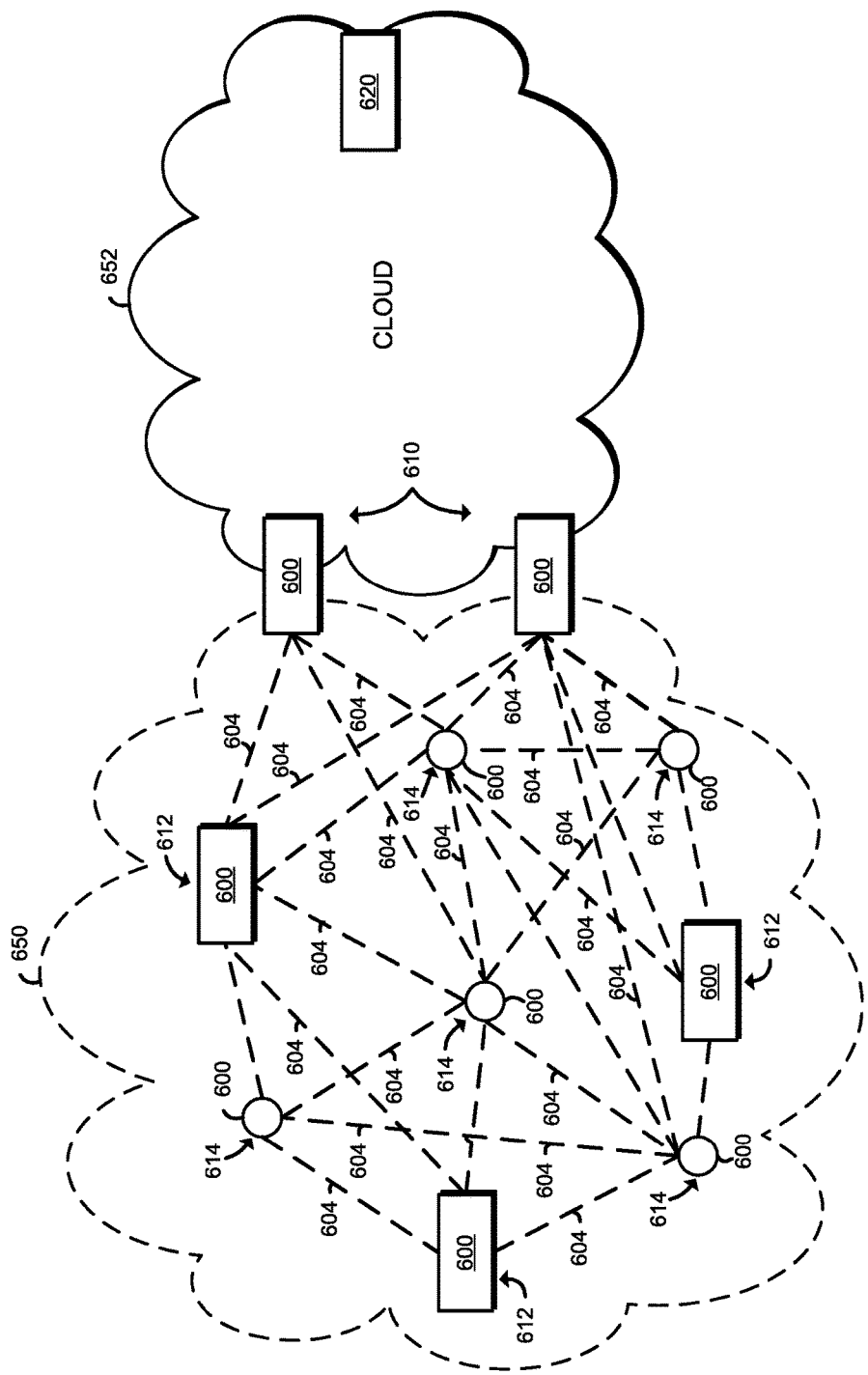
FIG. 6 is a simplified block diagram of another embodiment of a system having compute devices similar to that in FIG. 1 arranged in a mesh network.

Referring now to FIG. 6, in some embodiments, one or more compute devices 100 may be embodied as Internet-of-Things devices 600 and form, potentially with other devices, a mesh network, which may be termed as a fog 650, operating at the edge of a cloud network 652. The fog 650 may be considered to be a massively interconnected network wherein a number of IoT devices 600 are in communications with each other, for example, by links 604 (all of which are not labeled in FIG. 6 to simplify the figure and for clarify). Each of the links 604 may be a wire connection, a wireless connection, an optical connection, etc. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 600 are shown in the example embodiment of FIG. 6, gateways 610, data aggregators 612, and sensors 614, although any combinations of IoT devices 600 and functionality may be used. The gateways 610 may be edge devices that provide communications between the cloud 652 and the fog 650, and may also provide the backend process function for data obtained from sensors 614. The data aggregators 612 may collect data from any number of the sensors 614, and perform the back end processing function for the analysis. The results, raw data, or both may be passed along to the cloud 652 through the gateways 610. The sensors 614 may be full IoT devices 600, for example, capable of both collecting data and processing the data. In some cases, the sensors 614 may be more limited in functionality, for example, collecting the data and allowing the data aggregators 612 or gateways 610 to process the data.

Communications from any IoT device 600 may be passed along the most convenient path between any of the IoT devices 600 to reach the gateways 610. In these networks, the number of interconnections provide substantial redundancy, allowing communications to be maintained, even with the loss of a number of IoT devices 600. Further, the use of a mesh network may allow IoT devices 600 that are very low power or located at a distance from infrastructure to be used, as the range to connect to another IoT device 600 may be much less than the range to connect to the gateways 610. The fog 650 of the IoT devices 600 devices may be presented to devices in the cloud 652, such as a server 620, as a single device located at the edge of the cloud 652, e.g., a fog 650 device.

EXAMPLES

Illustrative examples of the devices, systems, and methods disclosed herein are provided below. An embodiment of the devices, systems, and methods may include any one or more, and any combination of, the examples described below.

Example 1 includes a compute device for internal time synchronization, the compute device comprising an always running timer; an always running timer controller to read a counter value from a counter of the always running timer; generate a timestamp value based on the counter value of the always running timer; and broadcast the timestamp value on a serial single-wire interface at a frequency of a first clock; a network interface card comprising a system timer and a local always running timer; and a network interface controller to sample a signal indicative of the timestamp value broadcasted on the serial single-wire interface; update a counter of the local always running timer based on the sampled signal; capture a snapshot of a counter of the system timer; capture a snapshot of the counter of the local always running timer, wherein to capture the snapshot of the local always running timer comprises to sample the local always running clock at a frequency of a second clock, wherein the frequency of the second clock is at least twice the frequency of the first clock; determine a phase of the local always running timer relative to the system timer; and store an indication of the snapshot of the counter of the system timer, an indication of the snapshot of the counter of the local always running timer, and an indication of the phase of the local always running timer.

Example 2 includes the subject matter of Example 1, and wherein the always running timer controller is further to convert the timestamp value from a parallel bus to the serial single-wire interface, and wherein the network interface controller is further to convert the signal from the serial single-wire interface to a parallel bus.

Example 3 includes the subject matter of any of Examples 1 and 2, and wherein the always running timer controller is further to broadcast, with the timestamp value, a synchronization pattern on the serial single-wire interface, wherein the network interface controller is further to determine whether the sampled signal includes the synchronization pattern; wherein to determine the timestamp value of the signal comprises to determine the timestamp value of the signal in response to a determination that the sampled signal includes the synchronization pattern.

Example 4 includes the subject matter of any of Examples 1-3, and wherein the always running timer controller is further to access an offset value indicative of a latency of a signal over the serial single-wire interface, wherein to generate, the timestamp value comprises to add the offset value to the counter value.

Example 5 includes the subject matter of any of Examples 1-4, and wherein the network interface controller is further to access an offset value indicative of a latency of a signal over the serial single-wire interface, wherein to update the counter of the local always running timer comprises to update the counter of the local always running timer based on the offset value.

Example 6 includes the subject matter of any of Examples 1-5, and wherein the always running timer controller is further to broadcast, with the timestamp value, one or more type bits, wherein the one or more type bits indicate whether the compute device is to broadcast timestamp values continuously or periodically.

Example 7 includes the subject matter of any of Examples 1-6, and wherein the always running timer controller is further to broadcast, with the timestamp value, one or more type bits, wherein the one or more type bits indicate whether an offset value should be added to the timestamp value.

Example 8 includes the subject matter of any of Examples 1-7, and wherein to broadcast the timestamp value comprises to broadcast the timestamp value without receipt of a request for the timestamp value.

Example 9 includes the subject matter of any of Examples 1-8, and wherein to broadcast the timestamp value on the serial single-wire interface comprises to broadcast the timestamp value to each of a plurality of components of the compute device different from the always running timer.

Example 10 includes the subject matter of any of Examples 1-9, and wherein the always running timer and the network interface card are integrated onto a single chip.

Example 11 includes the subject matter of any of Examples 1-10, and wherein the always running timer and the network interface card are integrated into a single multi-chip package.

Example 12 includes the subject matter of any of Examples 1-11, and wherein to broadcast the timestamp value on the serial single-wire interface comprises to broadcast a single-ended signal on the serial single-wire interface.

Example 13 includes the subject matter of any of Examples 1-12, and wherein the always running timer is configured to power down when the compute device enters a low power state.

Example 14 includes a method for internal time synchronization of a compute device, the method comprising reading, by the compute device, a counter value from a counter of an always running timer of the compute device; generating, by the compute device, a timestamp value based on the counter value of the always running timer; broadcasting, by the compute device, the timestamp value on a serial single-wire interface at a frequency of a first clock; sampling, by the compute device, a signal indicative of the timestamp value broadcasted on the serial single-wire interface; updating, by the compute device and based on the sampled signal, a counter of a local always running timer of a network card of the compute device; capturing, by the compute device, a snapshot of a counter of a system timer of the network interface card; capturing, by the compute device, a snapshot of the counter of the local always running timer, wherein capturing the snapshot of the local always running timer comprises to sample the local always running timer at a frequency of a second clock, wherein the frequency of the second clock is at least twice the frequency of the first clock; determining, by the compute device and based on the oversampled snapshot of the counter of the local always running timer, a phase of the always running timer relative to the system timer; and storing an indication of the snapshot of the counter of the system timer, an indication of the snapshot of the counter of the local always running timer, and an indication of the phase of the local always running timer.

Example 15 includes the subject matter of Example 14, and further including converting, by the compute device, the timestamp value from a parallel bus to the serial single-wire interface; and converting, by the compute device, the signal from the serial single-wire interface to a parallel bus.

Example 16 includes the subject matter of any of Examples 14 and 15, and further including broadcasting, by the compute device and with the timestamp value, a synchronization pattern on the serial single-wire interface; determining, by the compute device, whether the sampled signal includes the synchronization pattern; wherein determining the timestamp value of the signal comprises determining the timestamp value of the signal in response to a determination that the sampled signal includes the synchronization pattern.

Example 17 includes the subject matter of any of Examples 14-16, and further including accessing, by the compute device, an offset value indicative of a latency of a signal over the serial single-wire interface, wherein generating, the timestamp value comprises adding, by the compute device, the offset value to the counter value.

Example 18 includes the subject matter of any of Examples 14-17, and further including accessing, by the compute device, an offset value indicative of a latency of a signal over the serial single-wire interface, wherein updating the counter of the local always running timer comprises updating the counter of the local always running timer based on the offset value.

Example 19 includes the subject matter of any of Examples 14-18, and further including broadcasting, by the compute device and with the timestamp value, one or more type bits, wherein the one or more type bits indicate whether the compute device is to broadcast timestamp values continuously or periodically.

Example 20 includes the subject matter of any of Examples 14-19, and further including broadcasting, by the compute device and with the timestamp value, one or more type bits, wherein the one or more type bits indicate whether an offset value should be added to the timestamp value.

Example 21 includes the subject matter of any of Examples 14-20, and wherein broadcasting the timestamp value comprises broadcasting the timestamp value without receipt of a request for the timestamp value.

Example 22 includes the subject matter of any of Examples 14-21, and wherein broadcasting the timestamp value on the serial single-wire interface comprises broadcasting the timestamp value to each of a plurality of components of the compute device different from the always running timer.

Example 23 includes the subject matter of any of Examples 14-22, and wherein the always running timer and the network interface card are integrated onto a single chip.

Example 24 includes the subject matter of any of Examples 14-23, and wherein the always running timer and the network interface card are integrated into a single multi-chip package.

Example 25 includes the subject matter of any of Examples 14-24, and wherein broadcasting the timestamp value on the serial single-wire interface comprises broadcasting a single-ended signal on the serial single-wire interface.

Example 26 includes the subject matter of any of Examples 14-25, and further including powering down the always running timer when the compute device enters a low power state.

Example 27 includes one or more computer-readable media comprising a plurality of instructions stored thereon that, when executed, causes a compute device to perform the method of any of Examples 15-26.

Example 28 includes a compute device for internal time synchronization, the compute device comprising means for reading a counter value from a counter of an always running timer of the compute device; means for generating a timestamp value based on the counter value of the always running timer; means for broadcasting the timestamp value on a serial single-wire interface at a frequency of a first clock; means for sampling a signal indicative of the timestamp value broadcasted on the serial single-wire interface; means for updating, based on the sampled signal, a counter of a local always running timer of a network card of the compute device; means for capturing a snapshot of a counter of a system timer of the network interface card; means for capturing a snapshot of the counter of the local always running timer, wherein capturing the snapshot of the local always running timer comprises to sample the local always running timer at a frequency of a second clock, wherein the frequency of the second clock is at least twice the frequency of the first clock; means for determining, based on the oversampled snapshot of the counter of the local always running timer, a phase of the always running timer relative to the system timer; and means for storing an indication of the snapshot of the counter of the system timer, an indication of the snapshot of the counter of the local always running timer, and an indication of the phase of the local always running timer.

Example 29 includes the subject matter of Example 28, and further including means for converting the timestamp value from a parallel bus to the serial single-wire interface; and means for converting the signal from the serial single-wire interface to a parallel bus.

Example 30 includes the subject matter of any of Examples 28 and 29, and further including means for broadcasting, with the timestamp value, a synchronization pattern on the serial single-wire interface; means for determining whether the sampled signal includes the synchronization pattern; wherein the means for determining the timestamp value of the signal comprises means for determining the timestamp value of the signal in response to a determination that the sampled signal includes the synchronization pattern.

Example 31 includes the subject matter of any of Examples 28-30, and further including means for accessing an offset value indicative of a latency of a signal over the serial single-wire interface, wherein the means for generating, the timestamp value comprises means for adding the offset value to the counter value.

Example 32 includes the subject matter of any of Examples 28-31, and further including means for accessing an offset value indicative of a latency of a signal over the serial single-wire interface, wherein the means for updating the counter of the local always running timer comprises means for updating the counter of the local always running timer based on the offset value.

Example 33 includes the subject matter of any of Examples 28-32, and further including means for broadcasting, with the timestamp value, one or more type bits, wherein the one or more type bits indicate whether the compute device is to broadcast timestamp values continuously or periodically.

Example 34 includes the subject matter of any of Examples 28-33, and further including means for broadcasting, with the timestamp value, one or more type bits, wherein the one or more type bits indicate whether an offset value should be added to the timestamp value.

Example 35 includes the subject matter of any of Examples 28-34, and wherein the means for broadcasting the timestamp value comprises means for broadcasting the timestamp value without receipt of a request for the timestamp value.

Example 36 includes the subject matter of any of Examples 28-35, and wherein the means for broadcasting the timestamp value on the serial single-wire interface comprises means for broadcasting the timestamp value to each of a plurality of components of the compute device different from the always running timer.

Example 37 includes the subject matter of any of Examples 28-36, and wherein the always running timer and the network interface card are integrated onto a single chip.

Example 38 includes the subject matter of any of Examples 28-37, and wherein the always running timer and the network interface card are integrated into a single multi-chip package.

Example 39 includes the subject matter of any of Examples 28-38, and wherein the means for broadcasting the timestamp value on the serial single-wire interface comprises means for broadcasting a single-ended signal on the serial single-wire interface.

Example 40 includes the subject matter of any of Examples 28-39, and wherein the always running timer is configured to power down when the compute device enters a low power state.

The invention claimed is:

1. A compute device for internal time synchronization, the compute device comprising:
    an always running timer;
    an always running timer controller to:
        read a counter value from a counter of the always running timer;
        generate a timestamp value based on the counter value of the always running timer; and
        broadcast the timestamp value on a serial broadcast wire at a frequency of a first clock;
    a network interface card comprising a system timer and a local always running timer; and
    a network interface controller to:
        sample a signal indicative of the timestamp value broadcasted on the serial broadcast wire;
        update a counter of the local always running timer based on the sampled signal;
        capture a snapshot of a counter of the system timer;
        capture a snapshot of the counter of the local always running timer, wherein to capture the snapshot of the local always running timer comprises to sample the local always running timer at a frequency of a second clock, wherein the frequency of the second clock is at least twice the frequency of the first clock;
        determine a phase of the local always running timer relative to the system timer; and
        store an indication of the snapshot of the counter of the system timer, an indication of the snapshot of the counter of the local always running timer, and an indication of the phase of the local always running timer.

2. The compute device of claim 1, wherein the always running timer controller is further to broadcast, with the timestamp value, a synchronization pattern on the serial broadcast wire, wherein the network interface controller is further to determine whether the sampled signal includes the synchronization pattern;
    wherein to determine the timestamp value of the signal comprises to determine the timestamp value of the signal in response to a determination that the sampled signal includes the synchronization pattern.

3. The compute device of claim 1, wherein the always running timer controller is further to access an offset value indicative of a latency of a signal over the serial broadcast wire,
    wherein to generate, the timestamp value comprises to add the offset value to the counter value.

4. The compute device of claim 1, wherein the network interface controller is further to access an offset value indicative of a latency of a signal over the serial broadcast wire,
    wherein to update the counter of the local always running timer comprises to update the counter of the local always running timer based on the offset value.

5. The compute device of claim 1, wherein the always running timer controller is further to broadcast, with the timestamp value, one or more type bits, wherein the one or more type bits indicate whether an offset value should be added to the timestamp value.

6. The compute device of claim 1, wherein to broadcast the timestamp value comprises to broadcast the timestamp value without receipt of a request for the timestamp value.

7. The compute device of claim 1, wherein to broadcast the timestamp value on the serial broadcast wire comprises to broadcast the timestamp value to each of a plurality of components of the compute device different from the always running timer.

8. The compute device of claim 1, wherein the always running timer and the network interface card are integrated onto a single chip.

9. The compute device of claim 1, wherein the always running timer and the network interface card are integrated into a single multi-chip package.

10. The compute device of claim 1, wherein the always running timer is configured to power down when the compute device enters a low power state.

11. A method for internal time synchronization of a compute device, the method comprising:
    reading, by the compute device, a counter value from a counter of an always running timer of the compute device;
    generating, by the compute device, a timestamp value based on the counter value of the always running timer;
    broadcasting, by the compute device, the timestamp value on a serial broadcast wire at a frequency of a first clock;
    sampling, by the compute device, a signal indicative of the timestamp value broadcasted on the serial broadcast wire;
    updating, by the compute device and based on the sampled signal, a counter of a local always running timer of a network card of the compute device;
    capturing, by the compute device, a snapshot of a counter of a system timer of the network interface card;
    capturing, by the compute device, a snapshot of the counter of the local always running timer, wherein capturing the snapshot of the local always running timer comprises sampling the local always running timer at a frequency of a second clock, wherein the frequency of the second clock is at least twice the frequency of the first clock;

determining, by the compute device and based on the oversampled snapshot of the counter of the local always running timer, a phase of the local always running timer relative to the system timer; and storing an indication of the snapshot of the counter of the system timer, an indication of the snapshot of the counter of the local always running timer, and an indication of the phase of the local always running timer.

12. The method of claim 11, further comprising:

broadcasting, by the compute device and with the timestamp value, a synchronization pattern on the serial broadcast wire;

determining, by the compute device, whether the sampled signal includes the synchronization pattern;

wherein determining the timestamp value of the signal comprises determining the timestamp value of the signal in response to a determination that the sampled signal includes the synchronization pattern.

13. The method of claim 11, further comprising:

accessing, by the compute device, an offset value indicative of a latency of a signal over the serial broadcast wire, wherein generating, the timestamp value comprises adding, by the compute device, the offset value to the counter value.

14. The method of claim 11, further comprising:

accessing, by the compute device, an offset value indicative of a latency of a signal over the serial broadcast wire, wherein updating the counter of the local always running timer comprises updating the counter of the local always running timer based on the offset value.

15. The method of claim 11, further comprising broadcasting, by the compute device and with the timestamp value, one or more type bits, wherein the one or more type bits indicate whether an offset value should be added to the timestamp value.

16. The method of claim 11, wherein broadcasting the timestamp value comprises broadcasting the timestamp value without receipt of a request for the timestamp value.

17. The method of claim 11, wherein broadcasting the timestamp value on the serial broadcast wire comprises broadcasting the timestamp value to each of a plurality of components of the compute device different from the always running timer.

18. The method of claim 13, wherein broadcasting the timestamp value on the serial broadcast wire comprises broadcasting a single-ended signal on the serial broadcast wire.

19. One or more non-transitory computer-readable media comprising a plurality of instructions stored thereon that, when executed, causes a compute device to:

read a counter value from a counter of an always running timer of the compute device;

generate a timestamp value based on the counter value of the always running timer; and broadcast the timestamp value on a serial broadcast wire at a frequency of a first clock;

sample a signal indicative of the timestamp value broadcasted on the serial broadcast wire;

update, based on the sampled signal, a counter of a local always running timer of a network card of the compute device;

capture a snapshot of a counter of a system timer of the network interface card;

capture a snapshot of the counter of the local always running timer, wherein to capture the snapshot of the local always running timer comprises to sample the local always running timer at a frequency of a second clock, wherein the frequency of the second clock is at least twice the frequency of the first clock;

determine, based on the oversampled snapshot of the counter of the local always running timer, a phase of the local always running timer relative to the system timer; and store an indication of the snapshot of the counter of the system timer, an indication of the snapshot of the counter of the local always running timer, and an indication of the phase of the local always running timer.

20. The one or more non-transitory computer-readable media of claim 19, wherein the plurality of instructions further causes the compute device to:

broadcast, with the timestamp value, a synchronization pattern on the serial broadcast wire; and determine whether the sampled signal includes the synchronization pattern, wherein to determine the timestamp value of the signal comprises to determine the timestamp value of the signal in response to a determination that the sampled signal includes the synchronization pattern.

21. The one or more non-transitory computer-readable media of claim 19, wherein the plurality of instructions further causes the compute device to access an offset value indicative of a latency of a signal over the serial broadcast wire, wherein to generate, the timestamp value comprises to add the offset value to the counter value.

22. The one or more non-transitory computer-readable media of claim 19, wherein the plurality of instructions further causes the compute device to access an offset value indicative of a latency of a signal over the serial broadcast wire, wherein to update the counter of the local always running timer comprises to update the counter of the local always running timer based on the offset value.

23. The one or more non-transitory computer-readable media of claim 19, wherein the plurality of instructions further causes the compute device to broadcast, with the timestamp value, one or more type bits, wherein the one or more type bits indicate whether the compute device is to broadcast timestamp values continuously or periodically.

24. The one or more non-transitory computer-readable media of claim 19, wherein to broadcast the timestamp value comprises to broadcast the timestamp value without receipt of a request for the timestamp value.

25. The one or more non-transitory computer-readable media of claim 19, wherein to broadcast the timestamp value on the serial broadcast wire comprises to broadcast the timestamp value to each of a plurality of components of the compute device different from the always running timer.

* * * * *